(12) United States Patent
Hook et al.

(10) Patent No.: US 6,250,397 B1
(45) Date of Patent: Jun. 26, 2001

(54) SPRING TRIP STANDARD WITH POSITIVE STOP

(75) Inventors: Richard Wayne Hook; Richard David Zaun, both of West Des Moines, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/393,531

(22) Filed: Sep. 10, 1999

(51) Int. Cl.$^7$ .................................................. A01B 61/00
(52) U.S. Cl. ............................................ 172/265; 172/708
(58) Field of Search ..................................... 172/681, 705, 172/707, 708, 710, 763, 261, 264, 265, 266, 267, 268, 269; 111/155, 156, 151

(56) References Cited

U.S. PATENT DOCUMENTS

| | | | |
|---|---|---|---|
| 3,493,055 | | 2/1970 | Van Peursem ....................... 172/708 |
| 3,565,180 | | 2/1971 | Arnold et al. ........................ 172/265 |
| 3,700,039 | | 10/1972 | Essex et al. .......................... 172/265 |
| 3,782,481 | | 1/1974 | Quanbeck ............................. 172/265 |
| 3,981,367 | * | 9/1976 | Mydels ................................. 172/265 |
| 3,981,472 | * | 9/1976 | Anderson ......................... 172/705 X |
| 4,011,915 | * | 3/1977 | Anderson ............................. 172/265 |
| 4,193,456 | * | 3/1980 | Ankenman ........................... 172/272 |
| 4,200,157 | * | 4/1980 | Anderson ............................. 172/264 |
| 4,261,423 | | 4/1981 | Williamson .......................... 172/705 |
| 4,321,971 | | 3/1982 | Hake et al. ........................... 172/710 |
| 4,463,813 | * | 8/1984 | Long et al. ........................... 172/705 |
| 4,520,878 | | 6/1985 | Smith et al. .......................... 172/705 |
| 4,532,790 | * | 8/1985 | Nicholls .............................. 172/266 |
| 4,548,277 | * | 10/1985 | Dietrich, Sr. et al. ............... 172/265 |
| 4,700,785 | * | 10/1987 | Bartusek et al. ..................... 172/705 |
| 4,800,964 | * | 1/1989 | Rettig et al. ......................... 172/711 |
| 5,279,236 | * | 1/1994 | Truax .................................. 111/139 |
| 5,787,992 | * | 8/1998 | Dobson et al. ...................... 172/264 |

FOREIGN PATENT DOCUMENTS

| | | |
|---|---|---|
| 175736 | 2/1922 | (GB) . |
| 269394 | 4/1927 | (GB) . |

OTHER PUBLICATIONS

Morris, 9100 Series Floating Hitch Cultivator, one page of brochure, publication date and location—unknown.

Sunflower, one page of brochure, publication date and location—unknown.

\* cited by examiner

*Primary Examiner*—Victor Batson

(57) ABSTRACT

A spring trip standard for a tillage implement includes a coil spring freely compressed between an upper spring-abutting surface on the mounting bracket and a lower spring-abutting surface on a casting which is connected by a transverse pivot to the mounting bracket. A tool supporting shank is bolted to the casting and biased downwardly into a ground working position by the spring. The casting includes an integral downstop extending forwardly from the pivot. The downstop contacts the bottom of the bracket when the shank is in the ground working position so that a tension link between the bracket and casting is eliminated. A positive upstop limits upward pivoting of the casting to prevent spring breakage or permanent deformation of the spring. Shoulder areas on the casting contact rear edges of the mounting bracket to limit upward pivoting.

16 Claims, 2 Drawing Sheets

SPRING TRIP STANDARD WITH POSITIVE STOP

BACKGROUND OF THE INVENTION

1) Field of the Invention

The present invention relates generally to agricultural implements and, more specifically, to a spring trip standard for tillage implements.

2) Related Art

Spring trip standards typically include a mounting bracket attached to rectangular toolbar and extending upwardly and rearwardly to a downwardly and forwardly directed spring abutment surface. A spring is compressed between the abutment surface and an upwardly directed spring abutment surface on a member pivotally connected to the lower portion of the bracket, and a tool supporting shank is fixed to the member. A tension link assembly extends from the shank supporting member through the spring and through an aperture in the spring abutment surface on the bracket to adjust the preloading of the spring and vary the vertical position of the tool connected to the shank. Such an assembly is shown by way of example in U.S. Pat. No. 3,700,039 entitled SPRING TRIP SHANK ASSEMBLY. This type of shank assembly provides good trip force characteristics but has numerous parts and is expensive and time-consuming to assemble and repair. Previously available assemblies, particularly those with numerous tension link or spring support components such as pins, straps, spacers and washers, typically require extensive instructions for assembly and disassembly.

In some shank assemblies, the tension link reduces forces on the pivot area in the at rest position, thereby introducing some looseness in the pivot joints which often is perceived as a quality disadvantage and which causes the tool to have some lateral shift during operation. Often the precompression of the spring when the tool is in the normal operating position is not sufficient to prevent some continual tripping action. The portion of the tension link extending through the aperture is subject to wear as a result of such tripping action. In spring trip shank assemblies of the type shown in U.S. Pat. No. 4,520,878 the bottom of the coil spring rests on a seat which can swivel to maintain the lower face of the spring substantially normal to the longitudinal axis of the spring and thereby reduce spring buckling forces. In another type of assembly shown in U.S. Pat. No. 3,700,039, the lower end of the coil spring is free to rock on a clamp bolt to remain normal to the centerline of the spring. These devices introduce additional wear components into the assembly.

In our commonly assigned and copending application Ser. No. 09/216,270 filed Dec. 18, 1998 and entitled SPRING TRIP STANDARD, we describe a spring trip arrangement which does not require a tension link. In commonly assigned application Ser. No. 09/325,454 filed Jun. 3, 1999 and entitled SPRING TRIP STANDARD HAVING REDUCED SPRING BUCKLING FORCES, spring seat structure is described for providing generally perpendicular alignment of the lowermost coil of the spring relative to the centerline of the coil spring in both the field-working and the tripped positions so that spring buckling and spring fatigue caused by buckling are reduced. Upstop limit for the shank is provided by the spring when the spring coils stack against each other. When a shank trips upwardly over a large obstacle to the maximum tripped position, the force can be so great on the fully compressed spring, even when properly aligned between the spring abutment surfaces on the assembly, that the spring coils slip past one another causing permanent deformation of the spring and loss of normal spring characteristics.

BRIEF SUMMARY OF THE INVENTION

It is therefore an object of the present invention to provide an improved spring trip assembly for an implement. It is a further object to provide such an assembly which overcomes most or all of the aforementioned problems.

It is a further object of the present invention to provide an improved spring trip assembly which has fewer parts and is lower in cost than most previously available shank assemblies and which protects the spring against damaging forces when the shank trips to the limit position over obstacles. It is another object to provide such an assembly which protects the spring against permanent deformation when heavy trip forces are encountered.

It is still another object of the invention to provide an improved spring trip shank assembly wherein the spring is protected against permanent deformation. It is another object to provide such an assembly which is easier to assemble and disassemble than at least most previously available shank assemblies.

It is yet a further object of the present invention to provide an improved spring trip standard assembly having a loaded pivot area for perceived improvement in stability and tool tracking compared to many previously available assemblies, the assembly including a positive upstop to protect the spring against deformation. It is another object to provide such an assembly which includes a positive downstop. It is another object to provide such an assembly which has fewer parts and fewer wear areas than at least most previously available spring trip assemblies.

A spring trip standard for a tillage implement includes a coil spring compressed between an upper spring-abutting surface on the mounting bracket and a lower spring abutment surface on a casting which is connected by a transverse pivot to the mounting bracket. A tool supporting shank is bolted to the casting and biased downwardly into a ground working position by the spring. The casting includes a first integral stop extending forwardly from the pivot. The stop contacts the bottom of the bracket when the shank is in the ground working position so that a tension link between the bracket and casting is eliminated. A relatively high trip force prevents unwanted tripping of the shank and prevents looseness in the shank so the desired fore-and-aft and lateral position of the tool is maintained for maximum efficiency. The casting includes a spring receiving projection to help maintain the bottom of the spring in position. The projection is slotted to receive a simple compression tool for compressing the spring to disassemble and reassemble the standard. Wear only occurs in the components of a relatively inexpensive bushing and sleeve assembly in the pivot, and these components can be easily replaced using the tool to compress the spring and remove the loading from the pivot without complete disassembly of the unit. If complete disassembly is required for any reason, the tool permits complete relaxation of the spring. The shank assembly has a minimal number of components and is relatively inexpensive and easy to assemble.

The standard also includes a second stop to limit upward pivoting to a maximum tripped position wherein the spring is in or approaches a fully compressed condition but is not forced into an overly compressed condition wherein spring deformation occurs. In one embodiment, the casting includes opposite sides defining shoulders which abut the rear edges of the rearwardly opening, channel-shaped mounting bracket when the maximum tripped position is reached. The extended contact between the shoulders and the rear edges provides a strong, positive stop. Both the downstop and upstop functions are provided by a single casting. In another embodiment, a projection extending upwardly from the rear of the shank support contacts the mounting tube on the implement to limit upward pivoting of the support so the spring is not forced into an overly compressed condition.

The casting includes a spring abutment surface having a first portion which extends generally perpendicular to the spring axis when the shank is stopped in the normal working position to support the lowermost end of the spring. The opposite side of the spring abutment surface is angled relative to the first portion and abuts the lowermost coil of the compressed spring coils in the tripped position to maintain the spring in a generally non-buckling state. A generally perpendicular alignment of the lower coil relative to the centerline of the coil spring is maintained in both the field-working and tripped positions so that spring buckling and spring fatigue caused by buckling are reduced or eliminated. The combination of the spring abutment surfaces and the upstop structure provides an effective and efficient trip arrangement. When large trip forces are encountered by the shank, the spring is protected from deformation and breakage by the second stop. If trip force limits are exceeded, the shank may bend or break but the spring is protected. Since the shank is usually easier and faster to replace than a spring, down time is reduced by the improved shank assembly.

Wear only occurs in the components of a relatively inexpensive bushing and sleeve assembly in the pivot, and these components can be easily replaced. The shank assembly has a minimal number of components and is relatively inexpensive and easy to assemble. Spring buckling and breakage problems are virtually eliminated without need to introduce additional pivots, components or other wear areas.

These and other objects, features and advantages of the present invention will become apparent to one skilled in the art upon reading the following detailed description in view of the drawings.

BRIEF DESCRIPTION OF THE DRAWINGS

FIG. 3 is an enlarged side view of the shank support of FIGS. 1 and 2.

FIG. 4 is a top view of the shank support of FIG. 3.

DETAILED DESCRIPTION OF THE DRAWINGS

Figure 1:
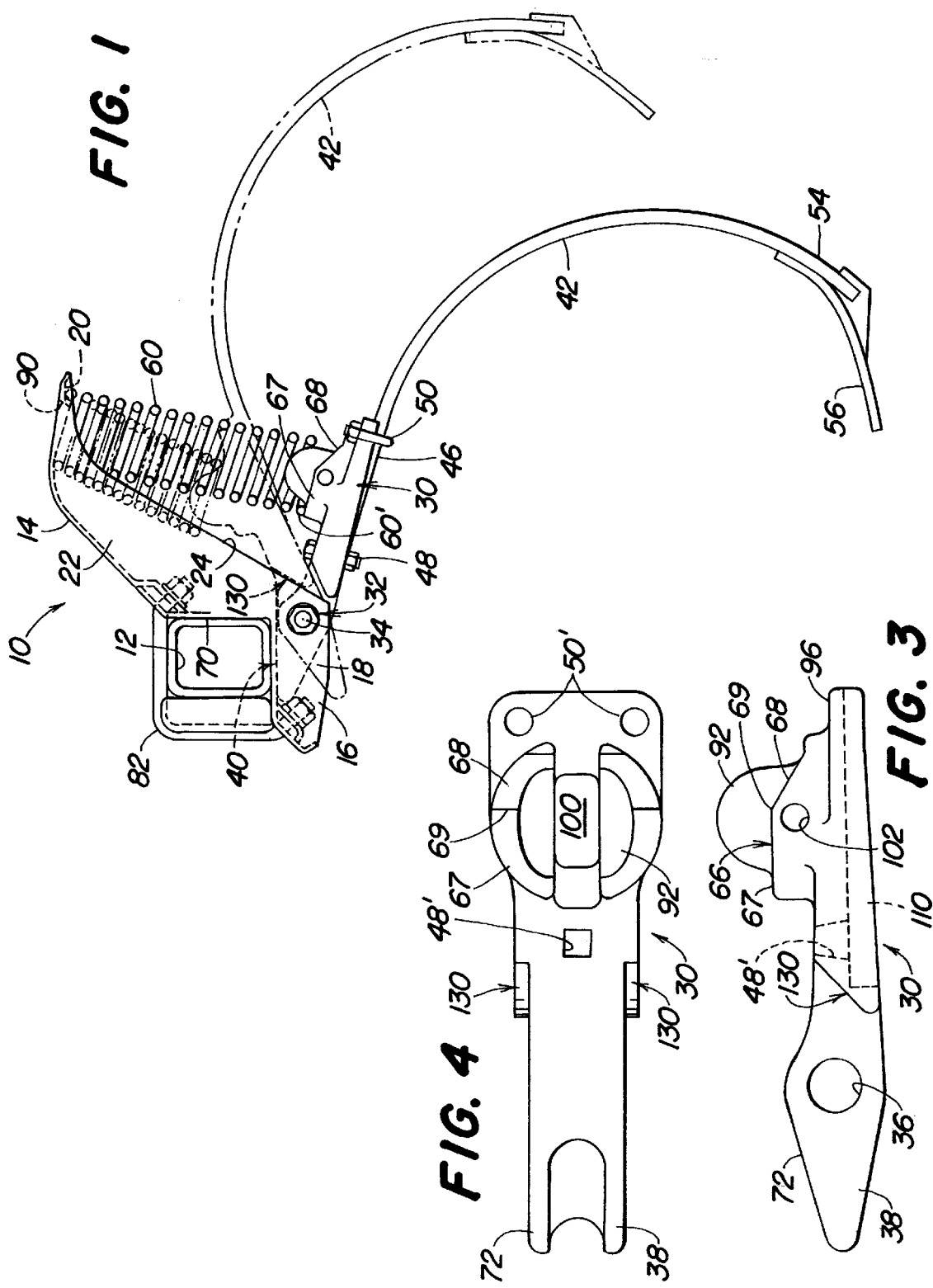
FIG. 1 is a side view of a spring trip shank assembly showing the shank in the normal field-working position (solid lines) and in the fully tripped position (broken lines).

Referring now to FIG. 1, therein is shown a spring trip standard assembly 10 connected to a transversely extending implement toolbar 12 of rectangular cross section.

The assembly 10 includes a rearwardly opening, channel-shaped bracket 14 having a forward mounting portion 16, a lower rear pivot area 18 and an upper spring-abutting surface 20 located rearwardly and above the pivot area 18. The bracket 14 includes upright side portions 22 terminating in rear upright edges 24 which extend between the pivot area 18 and the surface 20.

A shank support casting 30 is pivotally connected to the rear pivot area 18 by a bushing and sleeve assembly 32 including a mounting bolt 34 with chrome-plated steel bushing extending through a bore 36 (FIG. 3) in the casting between the sides of the bracket 14 below the forward, lowermost corner of the mounting portion 16 and forwardly of the edges 24. The casting 30 includes a fore-and-aft extension 38 projecting forwardly from the bore 36 and pivot area 18 under the mounting portion 16 and defining a downstop area indicated generally at 40 which limits downward (clockwise as viewed in FIG. 1) pivoting to establish a preselected field-working position as shown by the solid lines in FIG. 1. The extension 38 has a width approximately equal to but slightly less than the spacing between the side portions 22.

A C-shaped shank 42 includes an apertured upper end 46 connected by a bolt 48 to the casting 30. The bolt 48 extends through the upper end 46 and through a hole 48' (FIG. 3) in the casting 30. A U-bolt 50 extending around the shank 42 and through holes 50' in the casting 30 secures the upper end 46 to the aft end of the casting 30. The shank 42 curves downwardly and forwardly from the end 46 to a lowermost tool-receiving end 54 supporting an earthworking member or shovel 56.

A coil spring 60 is freely compressed between the upper spring-abutting surface 20 and a lower spring-abutting surface 66 on the casting 30 independently of any tension link or spring guide structure within the coils of the spring. The spring 60 is precompressed to provide the spring trip force that a tillage spring trip standard is rated at in the field-working position with the downstop 40 bottomed out as shown by the solid lines in FIG. 1. The field working position of the assembly 10, with the downstop bottomed out, provides the proper sweep to sweep to soil relationship. The precompression of the spring 60 in combination with the action of the downstop 40 loads the pivot to prevent looseness in the bushing and sleeve assembly 32. The spring-abutting surface 66 includes a first spring-receiving portion or surface 67 which is generally parallel to the upper spring-abutting surface 20 and supports the lowermost coil (60') when the shank 42 is in the field-working position and a second spring-receiving portion or surface 68 which is generally parallel to the surface 20 and supports the coil 60' when the shank approaches the uppermost tripped position (broken lines of FIG. 1). The offset portions 67 and 68 are connected by a transition area 69 and prevent excessive buckling of the spring 60 by maintaining the lowermost coil 60' normal to the spring centerline in both the fieldworking and the tripped positions.

The channel-shaped bracket 14 includes a notch 70 which abuts the rear and bottom faces of the toolbar 12. The pivot area 18 is located below the aft portion of the notch 70, and the downstop 40 includes a bracket surface 72 having an upper side which abuts the lower face of the toolbar 12 to provide a solid stop for the casting extension 38. A conventional U-bolt clamping arrangement 82 extends around the toolbar 12 and through apertures in the bracket 14 to secure the assembly 10 to the toolbar.

The upper spring-abutting surface 20 of the bracket 14 includes a circular indentation or downward projection 90 for maintaining the upper end of the coil spring 60 centered on the surface. A lower spring retaining projection 92 extends upwardly from a base 96 adjacent the surfaces 67 and 68 on the casting 30 to help locate the lower end of the coil spring 60 relative to the spring-abutting surface 66. The base 96 and the projection 92 are slotted to define a fore-and-aft extending notch 100 to facilitate factory assembly. A transverse bore 102 extends through the base 96. The notch 100 and the bore 102 facilitate field assembly and reassembly, if necessary. The bottom of the casting 30 includes a fore-and-aft extending cavity 110 (FIG. 2) opening rearwardly and downwardly and conforming generally to the shape of the upper end 46 of the shank 44. A thin hardened split sleeve is pressed into the bore 36 and receives the chrome-plated steel bushing and mounting bolt 34. The bolt 34 is tightened against the sides of the bracket 14 and clamps the steel bushing so the split sleeve rotates on the stationary bushing. Therefore, the only wear that occurs in the pivot area 18 is in the bushing and sleeve which are relatively inexpensive and easy to replace. By eliminating a pivoting lower bracket or coil supporting pin and using the sectioned lower spring-abutting surface 66 to maintain the coil 60' normal to the spring centerline in the field-working position and in the tripped position, another potential wear pin area is eliminated.

To limit upward pivoting of the casting 30 to a position wherein the spring 60 is approaching or in a fully compressed state without permanent deformation of the spring, a second stop or upstop is provided. As shown in FIGS. 1–4, the casting 30 includes contact areas 130 located rearwardly of the pivot area 18 and defining shoulders. The distance between the contact areas 130 is greater than the spacing between the side portions 22. The contact areas 130 preferably are generally planar surfaces angled upwardly in the rearward direction which are parallel to and fully engage the edges 24 of the lower portion of the bracket 14 to prevent further upward pivoting of the casting 30 when in the position shown by the broken lines in FIGS. 1 and 2. In the uppermost pivoted position of the casting 30 with the contact areas 130 abutting the edges 24, the spring 60 is at or near its fully compressed state but not yet to the state of compression wherein the coils begin to slip past one another to cause permanent spring deformation. Also, the surface 68 is parallel to the surface 20 so that spring buckling forces are minimized in the fully tripped position of the shank 42.

Figure 5:
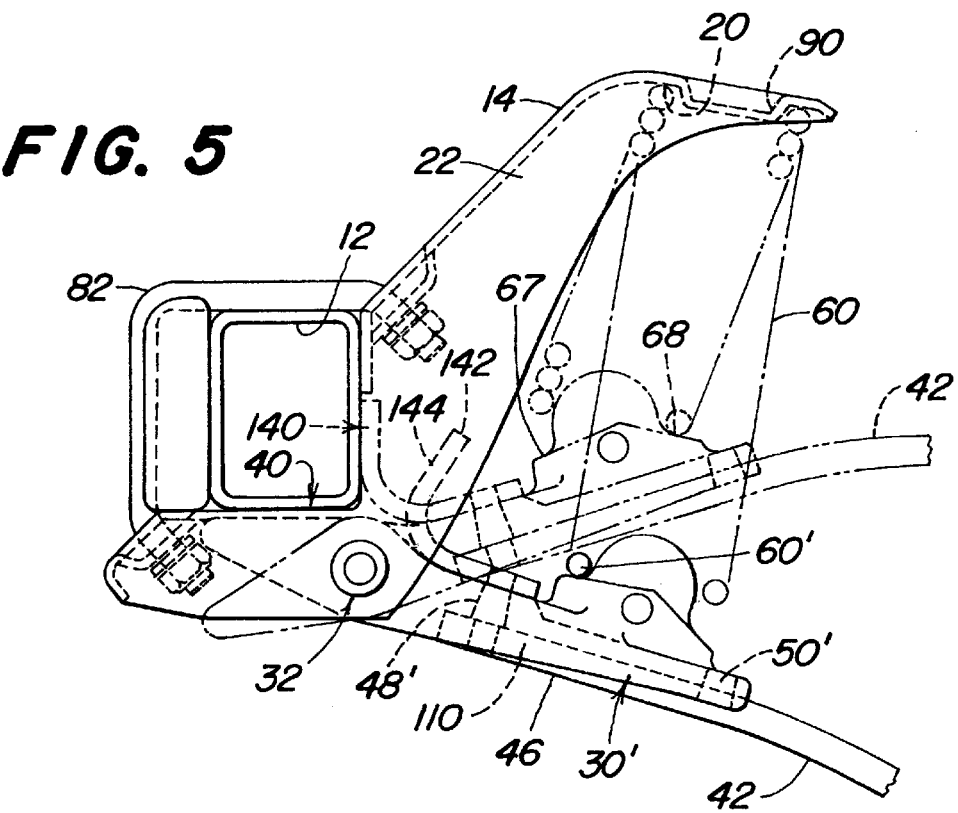
FIG. 5 is a view similar to FIG. 2 but showing an alternate embodiment of the upstop.

In the alternate embodiment of FIG. 5, an upstop 140 includes an angle 142 connected at the location of the hole 48' by the bolt 48 (removed in FIG. 5). The angle 142 has an upwardly projecting leg 144 which contacts the rear face of the toolbar 12 in the fully tripped position of the shank 42 (broken lines of FIG. 5) to prevent further pivoting of the casting 30'.

Figure 2:
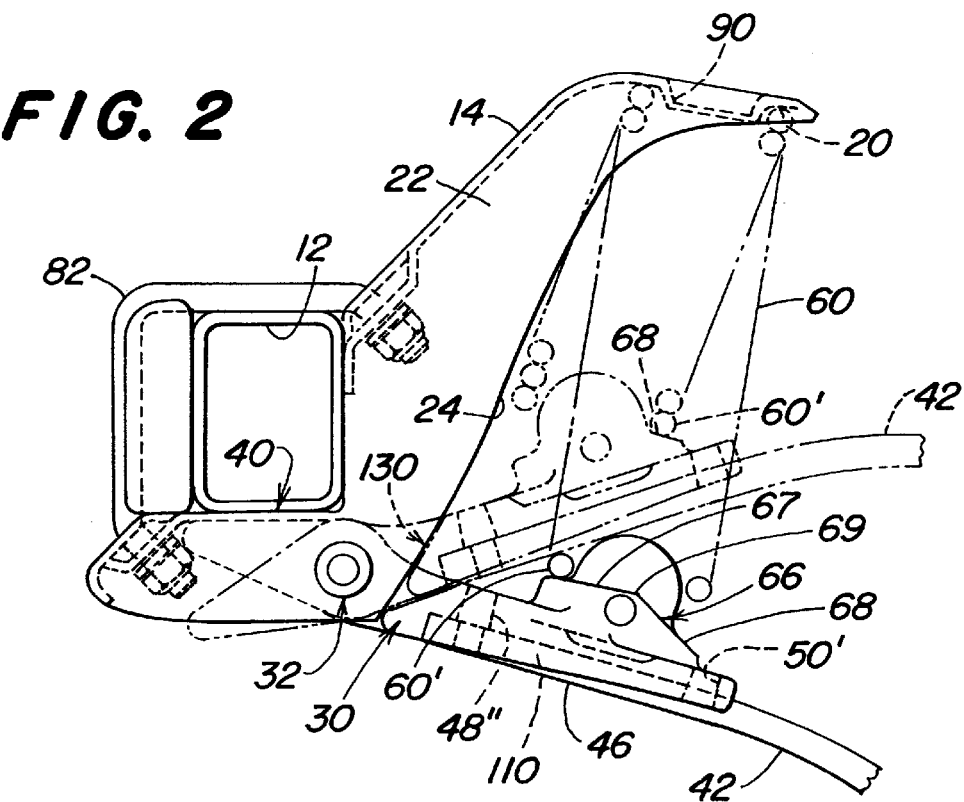
FIG. 2 is an enlarged side view of the shank support area of the assembly of FIG. 1.

In operation, the shank 42 is normally operating in the field-working position shown by the solid lines in FIGS. 1, 2 and 5. The lowermost coil 60' of the spring 60 rests on the forward surface 67 which is generally parallel to the upper spring-abutting surface 20 so that the spring has virtually no buckling forces in its preloaded field-working position (solid lines of FIG. 1 and 1a). If an obstacle is encountered by the tool 56, the shank 42 will start to trip, the spring 60 will start to compress, and the central portion of the spring will begin to bow forwardly towards the toolbar 12 as the angle of the surface 67 changes relative to the spring-abutting surface 20. However, if the shank 42 continues to trip upwardly, the lowermost coil 60' will rock from the position where it rests on the forward surface 67 to a position where it rests on the aft surface 68 which is approaching an attitude which is generally parallel to the upper spring-abutting surface to substantially reduce the spring-buckling forces. In the maximum tripped position, the surface 68 is generally parallel to the surface 20 so that the coil 60' is normal to the spring centerline and no buckling forces are present in the spring 60. Permanent deformation of the spring 60 is prevented by the upstop 130 (140 of FIG. 5). The spring support and stop arrangement optimizes the effectiveness of the spring 60 in the field-working and fully tripped positions and substantially eliminates spring buckling and spring deformation and breakage problems without need for wear-prone spring support pins or pivoting spring brackets.

Having described the preferred embodiment, it will become apparent that various modifications can be made without departing from the scope of the invention as defined in the accompanying claims.

What is claimed is:

1. A spring trip standard assembly adapted for mounting on a toolbar, the spring trip standard assembly adapted for supporting a tool and moving the tool forwardly through the ground, comprising:

a bracket adapted for securing to the toolbar, the bracket including an upper spring-abutting surface and a lower pivot area;

a shank member pivotally connected to the lower pivot area and extending rearwardly and downwardly therefrom to a tool-supporting end;

a lower spring-abutting surface located on the shank member rearwardly of the pivot area and below the upper spring-abutting surface;

a coil spring compressed between the spring-abutting surfaces and biasing the tool-supporting end towards a ground engaging position, the coil spring having coils movable toward a compressed condition as the shank trips upwardly from the ground engaging position over obstacles in the ground;

an upstop limiting upward movement of the shank member and preventing compression of the spring beyond the compressed condition to thereby prevent permanent deformation of the spring when the obstacles are encountered; and wherein the upstop comprises a projection connected to the shank member and contacting an area of the toolbar adjacent the bracket as the coils move into the compressed condition.

2. The spring trip standard assembly as set forth in claim 1 wherein the shank member also includes a downstop member outside the coils for preventing movement of the tool-supporting end below the ground engaging position.

3. The spring trip standard assembly as set forth in claim 2 further comprising a removable bearing structure connecting the shank member to the pivot area, the downstop member and spring providing loading on the bearing structure to prevent looseness in the pivot area when the tool-supporting end is in the ground-engaging position.

4. The spring trip standard assembly as set forth in claim 1 wherein the spring-abutting surfaces are substantially parallel when the tool is in the ground engaging position.

5. A spring trip standard assembly adapted for mounting on a toolbar, the spring trip standard assembly adapted for supporting a tool and moving the tool forwardly through the ground, comprising:

a bracket adapted for securing to the toolbar, the bracket including an upper spring-abutting surface and a lower pivot area;

a shank member pivotally connected to the lower pivot area and extending rearwardly and downwardly therefrom to a tool-supporting end;

a lower spring-abutting surface located on the shank member rearwardly of the pivot area and below the upper spring-abutting surface;

a coil spring compressed between the spring-abutting surfaces and biasing the tool-supporting end towards a ground engaging position, the coil spring having coils movable toward a compressed condition as the shank trips upwardly from the ground engaging position over obstacles in the ground;

an upstop limiting upward movement of the shank member and preventing compression of the spring beyond the compressed condition to thereby prevent permanent deformation of the spring when the obstacles are encountered; and wherein the shank member includes a casting and the upstop includes a surface on the casting which contacts the bracket as the spring reaches the compressed condition.

6. The spring trip standard assembly as set forth in claim 5 wherein the upstop comprises a projection connected to the shank member and contacting an area of the toolbar adjacent the bracket as the coils move into the compressed condition.

7. The spring trip standard assembly as set forth in claim 5 wherein the casting also includes an integral downstop member.

8. The spring trip standard assembly as set forth in claim 5 wherein the bracket includes upright rear edges and the surface comprises shoulders on opposite sides of the casting which bottom against the rear edges as the spring reaches the compressed condition.

9. A spring trip standard for a tillage implement adapted for forward movement over the ground, the standard including a mounting bracket having an upper spring-abutting surface, a shank support including a pivot connected to the mounting bracket and a lower spring-receiving surface located below the upper spring-abutting surface, a coil spring compressed between the upper spring-abutting surface and the lower spring-receiving surface, a tool supporting shank connected to the shank support and biased downwardly into a ground working position by the coil spring, wherein the shank support includes a first stop contacting the bracket when the shank is in the ground working position and a second stop contacting the bracket to limit upward pivoting of the shank support beyond a preselected position wherein the spring is in or near a fully compressed state, and wherein the second stop comprises a shouldered portion which abuts the bracket when the shank support is in the preselected position.

10. The spring trip shank assembly as set forth in claim 9 wherein the first stop is integral with the second stop.

11. The spring trip shank assembly as set forth in claim 10 wherein the pivot includes a bushing and sleeve assembly pivotally connecting the shank support to the bracket, the first stop and coil spring compression preventing looseness in the pivot.

12. The spring trip shank assembly as set forth in claim 10 wherein the first and second stops comprise a unitary casting.

13. The spring trip shank assembly as set forth in claim 9 wherein the upper spring-abutting surface and the lower spring-abutting surface are substantially in a parallel relationship when the shank is in the ground working position.

14. The spring trip shank assembly as set forth in claim 9 wherein the bracket is channel-shaped and opens rearwardly to define offset rear edges, and wherein the shouldered portions comprise surfaces contacting the rear edges when the shank support is in the preselected position.

15. A spring trip standard assembly adapted for mounting on a toolbar, the spring trip standard assembly adapted for forward movement over the ground during field-working operations and comprising:

a bracket adapted for securing to the toolbar, the bracket including an upper spring-abutting surface;

shank structure pivotally connected to the lower pivot area and extending rearwardly and downwardly therefrom to a tool-supporting end;

a lower spring-abutting surface located on the shank structure below the upper spring-abutting surface, the upper and lower spring-abutting surfaces defining a spring-receiving area between the shank structure and the bracket;

a coil spring compressed and solely located in the spring-receiving area between the spring-abutting surfaces, the coil spring having open coils and biasing the tool-supporting end towards a ground engaging position and being substantially free of tension linkage structure extending through the spring;

wherein the shank structure includes a shank support;

an upstop limiting upward pivoting of the shank structure beyond a preselected uppermost position independently of the tension spring and limiting compression of the spring thereby preventing breakage and deformation of the spring;

a downstop extending forwardly from the lower pivot area and limiting downward pivoting of the shank structure; and wherein the shank support comprises a casting and the upstop and downstop are integral to the shank support.

16. A spring trip standard assembly adapted for mounting on a toolbar, the spring trip standard assembly adapted for forward movement over the ground during field-working operations and comprising:

a bracket adapted for securing to the toolbar, the bracket including an upper spring-abutting surface;

shank structure pivotally connected to the lower pivot area and extending rearwardly and downwardly therefrom to a tool-supporting end;

a lower spring-abutting surface located on the shank structure below the upper spring-abutting surface, the upper and lower spring-abutting surfaces defining a spring-receiving area between the shank structure and the bracket;

a coil spring compressed and solely located in the spring-receiving area between the spring-abutting surfaces, the coil spring having open coils and biasing the tool-supporting end towards a ground encasing position and being substantially free of tension linkage structure extending through the spring;

wherein the shank structure includes an upstop limiting upward pivoting of the shank structure beyond a preselected uppermost position independently of the tension spring and limiting compression of the spring thereby preventing breakage and deformation of the spring, and a downstop extending forwardly from the lower pivot area and limiting downward pivoting of the shank structure; and wherein the upstop includes a stop surface on the shank structure, the stop surface abutting the bracket when the shank structure is in the preselected uppermost position.

* * * * *